United States Patent
Kordick (10) Patent No.: US 10,375,876 B2
(45) Date of Patent: Aug. 13, 2019

(54) VARIABLE RATE AIR SEEDING SYSTEM FOR SOYBEANS

(71) Applicant: Rusty Kordick, Norwalk, IA (US)

(72) Inventor: Rusty Kordick, Norwalk, IA (US)

(73) Assignee: J & L CUSTOM FENCE, INC., Prole, IA (US)

( * ) Notice: Subject to any disclaimer, the term of this patent is extended or adjusted under 35 U.S.C. 154(b) by 47 days.

(21) Appl. No.: 15/467,720

(22) Filed: Mar. 23, 2017

(65) Prior Publication Data

US 2017/0273235 A1 Sep. 28, 2017

Related U.S. Application Data

(60) Provisional application No. 62/312,123, filed on Mar. 23, 2016.

(51) Int. Cl.
*A01C 7/10* (2006.01)
*A01C 7/04* (2006.01)
*A01C 19/02* (2006.01)

(52) U.S. Cl.
CPC ............ *A01C 7/102* (2013.01); *A01C 7/046* (2013.01); *A01C 19/02* (2013.01)

(58) Field of Classification Search
CPC .. A01C 7/10; A01C 7/04; A01C 19/02; A01C 7/084; A01C 7/082; A01C 21/005; A01C 7/102; A01C 7/08; A01C 7/00; A01C 7/046; A01C 7/044; A01C 7/042; A01C 19/00
USPC ....................................................... 111/178
See application file for complete search history.

(56) References Cited

U.S. PATENT DOCUMENTS

| | | | |
|---|---|---|---|
| 2,943,584 A * | 7/1960 | Palmer | A01C 23/006 111/67 |
| 5,831,542 A * | 11/1998 | Thomas | A01C 7/105 340/684 |
| 7,377,221 B1 | 5/2008 | Brockmeier | |
| 7,617,785 B2 | 11/2009 | Wendte | |
| 8,516,969 B2 * | 8/2013 | Wendte | A01C 7/046 111/185 |
| 8,863,676 B2 | 10/2014 | Brockmann et al. | |
| 2012/0103238 A1* | 5/2012 | Beaujot | A01C 7/06 111/174 |
| 2012/0174844 A1* | 7/2012 | Friggstad | A01C 7/125 111/175 |
| 2013/0192503 A1* | 8/2013 | Henry | A01C 7/082 111/174 |
| 2015/0216109 A1* | 8/2015 | Meyer | A01C 7/081 222/334 |

(Continued)

*Primary Examiner* — Christopher J. Novosad
(74) *Attorney, Agent, or Firm* — Christopher A. Proskey; BrownWinick Law Firm (57) ABSTRACT

An air seeding system and method includes a manifold mounted across a plurality of row planter units. Electric motors are mounted on the manifold and are operatively connected to the seed meters. A microprocessor or controller adjusts the speed of the motors in response to field data input so as to adjust the rate of seed dispensement to achieve desired plant population. The motor speeds can be adjusted on the fly, without stopping the air seeder. The system senses ground speed, senses the raised and lowered positioned of the row planter units, and senses any blockage of the row planter units. The motors eliminate the need for a ground drive wheel.

15 Claims, 12 Drawing Sheets

(56) References Cited

U.S. PATENT DOCUMENTS

| | | | |
|---|---|---|---|
| 2016/0037713 A1* | 2/2016 | Wendte | A01C 21/005 111/177 |
| 2016/0120097 A1* | 5/2016 | Chahley | G05D 7/0617 701/50 |
| 2016/0120106 A1* | 5/2016 | Zacharias | A01C 7/082 137/637.1 |
| 2016/0120111 A1* | 5/2016 | Gervais | G01F 11/24 222/333 |
| 2016/0205867 A1* | 7/2016 | Montag | A01C 15/04 |
| 2017/0196162 A1* | 7/2017 | Sheppard | A01C 19/02 |

* cited by examiner

VARIABLE RATE AIR SEEDING SYSTEM FOR SOYBEANS

CROSS-REFERENCE TO RELATED APPLICATIONS

This application claims priority to previously filed provisional application, U.S. Ser. No. 62/312,123, filed Mar. 23, 2016, which is herein incorporated by reference in its entirety.

BACKGROUND OF THE INVENTION

Field of the Invention

The present invention relates to agricultural machines that utilize pneumatic conveyance at some point between a bulk quantity of product and ground working tools and which use a distribution manifold to split bulk product to the various ground working tools and, in particular, to control an operation of such a distribution manifold. In particular, the invention is directed to an air seed planter with variable speed discharge for precision population planting and selective row shut off to eliminate seed waste.

Problems in the Art

Many different types of air seeders are used for farming in planting crops, such as wheat and soybeans. However, with different seed sizes and shapes for different crops it is hard to properly set the planter for varying seed population. Some planters such as a corn planter, allow multiple sections to shut off to stop seed dispersement for individual rows or sets of rows, but only a few models of air seeders to date have that capability. Also, the equipment is not universal or interchangeable between one type of seed and another type of seed.

Conventional planters, such as for soybeans, utilize a mechanical transmission with a drive tire contacting the ground. In operation, the seed population is set by the RPM's of the drive tire as the planter moves across the field. There is little, if any, ability to adjust or change the seed population on the fly.

With improvements in precision farming and the use of GPS, accurate planting is critical for improving yield and minimizing cost. However, commercial planter manufacturers do not have equipment which allows for row shut off and variable rate seeding.

One specific example of a current way of controlling the distribution manifold in an air cart type planter is described in U.S. Pat. No. 5,980,163, which is incorporated by reference herein. In this example, the tow-behind air seeder implement carries one or more bulk seed hoppers that pass seed in bulk by gravity, pneumatics, or other techniques to seed distribution manifold. A plurality of tubes or conduits from distribution manifold are in communication with a plurality of ground working tools. The manifold operates to split incoming bulk seed from hoppers into the multiple tubes to define multiple paths for seed to the ground working tools. This is a relatively mature art.

A different configuration for an air seeder can be seen in a John Deere 1990 Central Commodity System (CCS™) system which is commercially available. A hopper, manifold, and ground tools are integrated in one tow-behind implement.

One example of a distribution manifold is shown in U.S. Pat. No. 5,980,163. Seed inlets would be underneath and in communication with bulk seed from hopper. Individual tubes would connect to a plurality of seeding shoes. A changeable cartridge with plural essentially seed meters is installable between inlets and outlets.

As explained in detail in U.S. Pat. No. 5,980,163, a hexagonal-in-cross-section driveshaft extends across the manifold width. A plurality of seed metering rollers are mounted in spaced-apart positions axially on the hex axle. As is well known in the art, bulk seed is distributed through inlets to the tops of seed rollers. A driven gear attached to the hex axle rotates proportionally to ground speed of the air seeder by a chain drive connected to a ground-contacting wheel on or associated with air seeder. Thus, all of rollers rotate at the same speed and in accordance with rotation of the hex shaft. As explained in U.S. Pat. No. 5,980,163, these rollers have alternating ridges and valleys and are designed to take up essentially the same amount of seed per valley (in the example of soybeans, one soybean seed per roller valley). Thus, the rollers essentially divide (with soybeans singulate) the incoming bulk product and discharge it serially into an individual output. While this relates the seed distribution to ground speed, it is limited to that relationship. It also is limited to rotating all the seed rollers on the hex axle at the same rate.

There is recognition in the state-of-the-art of the need for more control at this distribution manifold. For example, U.S. Pat. No. 8,196,534, incorporated by reference herein, discusses the need for sectional shut-off of the manifold. It can be desirable to shut off a section of the manifold if, for example, less than the full width of the seeder is required. One example is header rows. Sometimes the full planter width is not needed. Without such sectional shutoff, seed would be wasted by planting outside desired planting boundaries or by overlapping previously seeded ground. Other examples of need for sectional shut-down are known in this art.

The solution for sectional shut-down in U.S. Pat. No. 8,196,534 is to utilize a clutch at a multiple part seed roller. As explained, when the clutch is engaged, the entire multi-part seed roller rotates with the hex axle. The clutch can be disengaged by an electrical signal to a coil at the seed roller. The inner part of the seed roller at the hex axle continues to spin with the hex-axle, but the outer seed-holding part of the roller stops rotating. Thus seed distribution from that roller stops. However, this is a relatively complex structure and could be subject to maintenance and durability issues. It also is limited to control of on/off of turning of the seed roller. It cannot adjust its speed of the hex axle. Thus, there still is room for improvement in this technological art.

Accordingly, a primary objective of the present invention is a provision of an air seed planter capable of dispensing seeds at a variable rate and having row control so as to reduce excess planting and seed waste.

Yet another objective of the present invention is the provision of a air seeder planter which decreases seed costs.

Another objective of the present invention is a provision of a seed planter which can be programmed to adjust the seed population according to varying field conditions.

Still another objective of the present invention is a provision of a seed planter wherein the seed population can be adjusted by the operator as the planter moves through the field.

Further objects, features, aspects, or advantages of the present invention can include provision of one or more of:
  (a) a seed planter which eliminates the drive wheel of prior art planters.
  (b) a seeding system having a controller that drives a variable speed electric motor, reads a motor shaft speed sensor for measuring the seed application rate, and communicates with a network in the tractor;

(c) a seeding system which communicates with a tractor network to provide monitoring and calibration options for variable seed planting rate;

(d) a seeding system which has sectional shut off capability;

(e) a variable rate air seeding system;

(f) a seeding system having sensors for measuring ground speed of the seeder;

(g) a seeder which notifies the operator when blockage occurs in the planter units; and/or (h) a seeder which utilizes a variable speed electric motor on each row planter to provide on the fly variable rate control of soybeans and other seeds dispensed from each section on the manifold.

Another objective of the present invention is the provision of a seeding system which can be a part of an original equipment planter or which can be an after-market system for installation or existing planters.

Yet another objective of the present invention is the provision of a seeding system which is economical to manufacture, durable, and effective in use.

These and other objectives, aspects, features, or advantages will become apparent from the following description of the invention.

SUMMARY OF THE INVENTION

An air seeding system for use on a planter having a plurality of row units includes a seed meter associated with each row unit, and variable speed electric motors operatively connected to the seed meters to control the rate of dispensement of the soybean seeds from the planter. A control system is provided on the seed system to allow adjustment of the electric motor speed while the planter is operating in the field. The control system includes one or more sensors which provide data to the operator in the tractor via the tractor network. The system also allows individual electric motors to be selectively shut off during operation of the planter.

A seed planting method of the present invention dispenses the seeds on an air seeder and utilizes variable speed electric motors to control the dispensement rate of the seeds. The method provides field data to a controller connected to the electric motors, and adjusts the speed of the electric motors in response to the field data, so as to vary the rate of seed dispensement in different parts of the field.

In one aspect, the invention allows both on/off and speed control of sets of one or more seed rollers in a distribution manifold. Actuators are operatively connected to each seed roller set. The actuator is controllable to cause either rotation or non-rotation for a roller set. When rotating its roller set, it also can be adjusted to vary to the speed of rotation of that set. One example of an actuator is an electrical motor and related gear train. A drive gear at the electric motor drive shaft is engageable with a driven wheel that causes commensurate rotation of the set of seed rollers. By on/off control of the electric motor, on and off states of the roller sets is controlled. By adjustment of motor the electric motor, rotation at speed of the roller is set. This combination provides a high level of flexibility of control of seed distribution. Thus, each seed roller set can be individually and independently be turned on or off. But, in addition, by varying speed of rotation of the electrical motor with an appropriate control signal, the rate of metering at each set of rollers is adjustable. This control be divorced from implement ground speed, which may be utilized, but is not required. Additionally, the independent control of sets of the rollers, and in some cases individual control, can allow adjustment across the width of the implement of distribution rate. In one example this would allow seed population rate to be varied at different locations across the planter. Optionally, feedback from the electric motors can be utilized by a controller to monitor motor speed. By calibration and programming, the controller could adjust motors relative this feedback. Optionally, a controller could obtain other sensed measurements or use other parameters for intelligent control of each of the motors. One example would be ground speed from a navigation system such as GNSS or inertial, or a combination of the two. Another example would be to adjust distribution rate based on reference to a field map through a precision farming system. Still further, the operator could manually select which seed rollers or sets are turned on or off for various reasons through a user-interface.

Another aspect of the invention relates to a distribution manifold. A plurality of rollers are positioned between a bulk product supply and product distribution outlets. Sets of the rollers are operatively connected to an actuator motor that allows independent on/off and speed control of rotation of the set of rollers. Each set of rollers can be one roller or a plurality rollers.

In another aspect of the invention, a system according to the invention utilizes one or more manifolds as described above. An intelligent control such as programmable digital controller or the like controls motors which, in turn, control on/off states and distribution rate at each set of rollers. The system optionally includes connection to other intelligent devices such as navigation systems, precision ag systems, or even other computers. Data or sensors help inform control of on/off states or speed of any of the motors at the distribution manifold. Some of the data or sensors can be available from other systems such as precisions farming or navigation systems.

DETAILED DESCRIPTION OF THE EXEMPLARY EMBODIMENTS OF THE INVENTION

Overview

For better understanding of the invention, several embodiments of forms it can take will now be described in detail.

It is to be understood that the invention can take many forms and embodiments. These examples are neither exclusive nor inclusive of all such forms or embodiments.

For example, most of the embodiments will be described in the context of a soybean planter where seed distribution is by air seeder techniques. It is to be understood that the invention can be applied in analogous ways to other row crop seeds. Additionally, it can also be applied in analogous ways to other bulk product distribution where bulk product is split or distributed into multiple conduits for introduction into the ground. Non-limiting examples are particulate soil fertilizers, nutrients or additives, herbicides, pesticides, insecticides, and the like.

By way of another example, even the embodiments that relate to air seeders can vary. For example, exemplary embodiments show a single distribution manifold. The invention can be applied in analogous ways to all product dispensers that have multiple such manifolds. For example, some systems have a primary distribution manifold to split the bulk product into multiple streams. Secondary distribution manifolds are then utilized in analogous ways at each such distribution stream. On the other hand, there can be two or more identical distribution manifolds on the same implement each handling its own bulk product source.

Generalized Embodiment

Figure 1A:
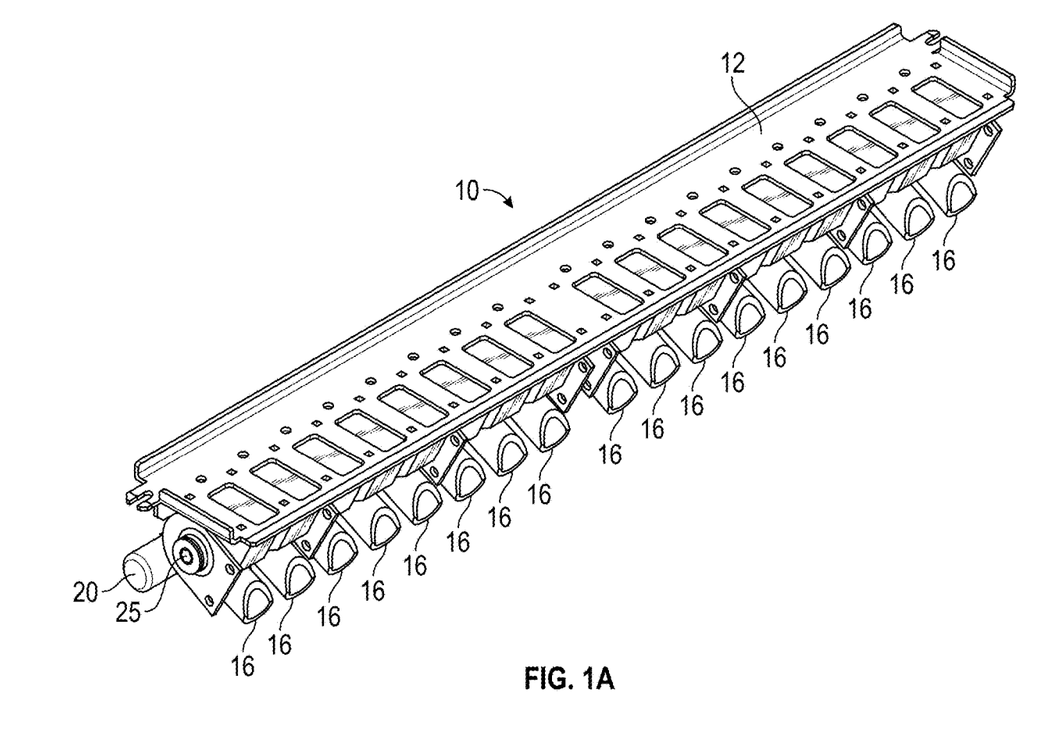
FIGS. 1A, 1B and 1C are perspective views of an air seeder manifold from different viewing angles according to one exemplary embodiment of the present invention.
Figure 1B:
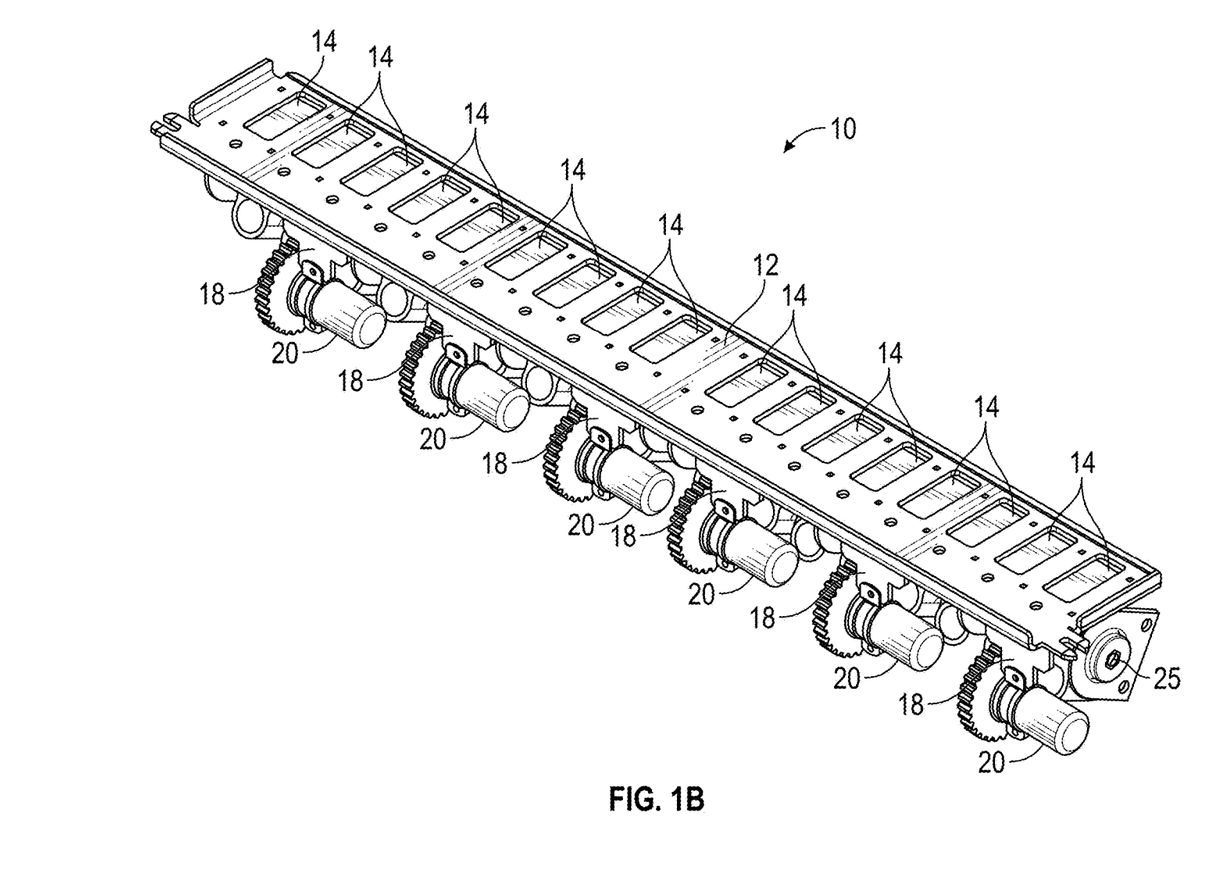
Figure 1C:
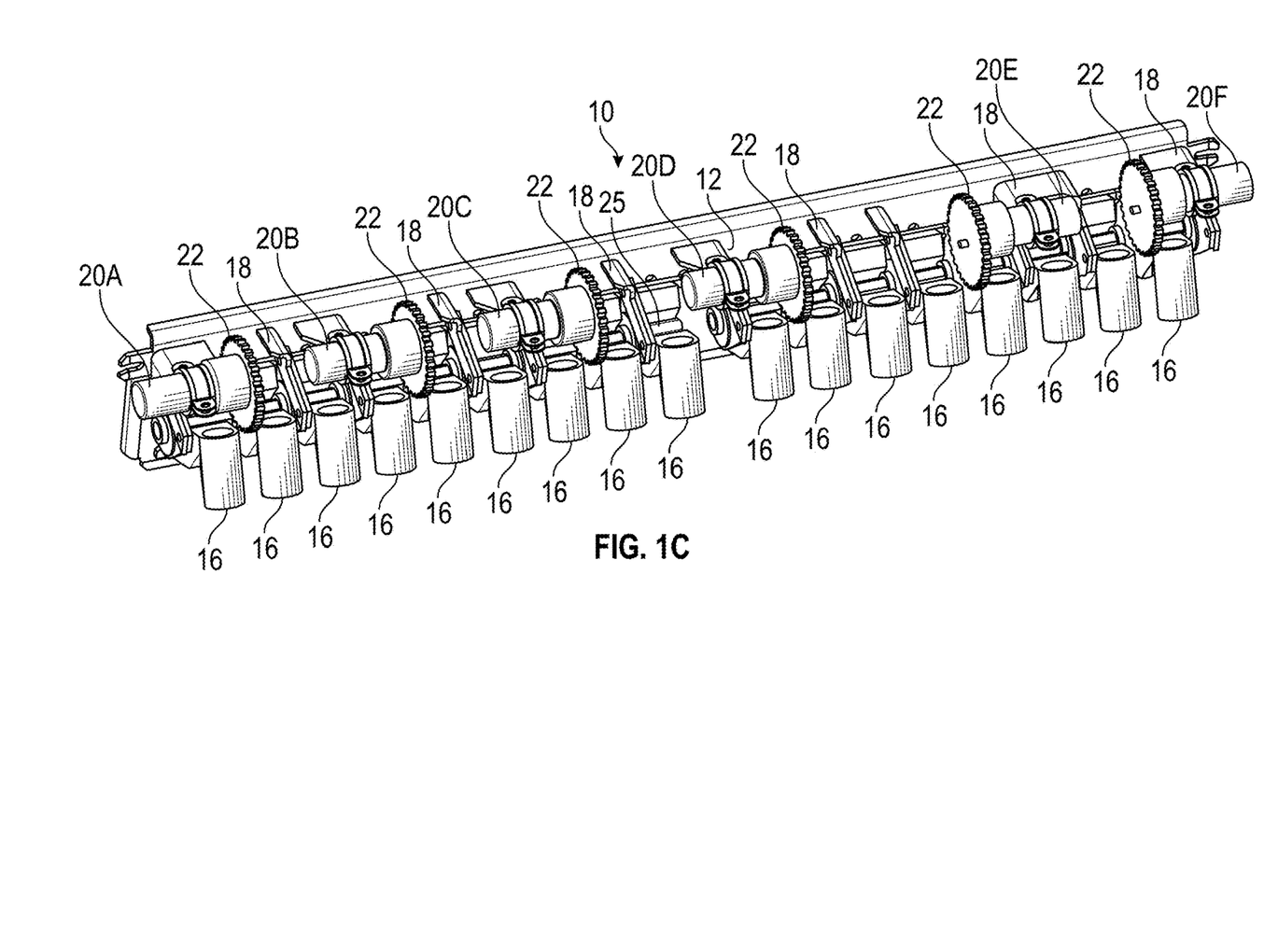
Figure 2:
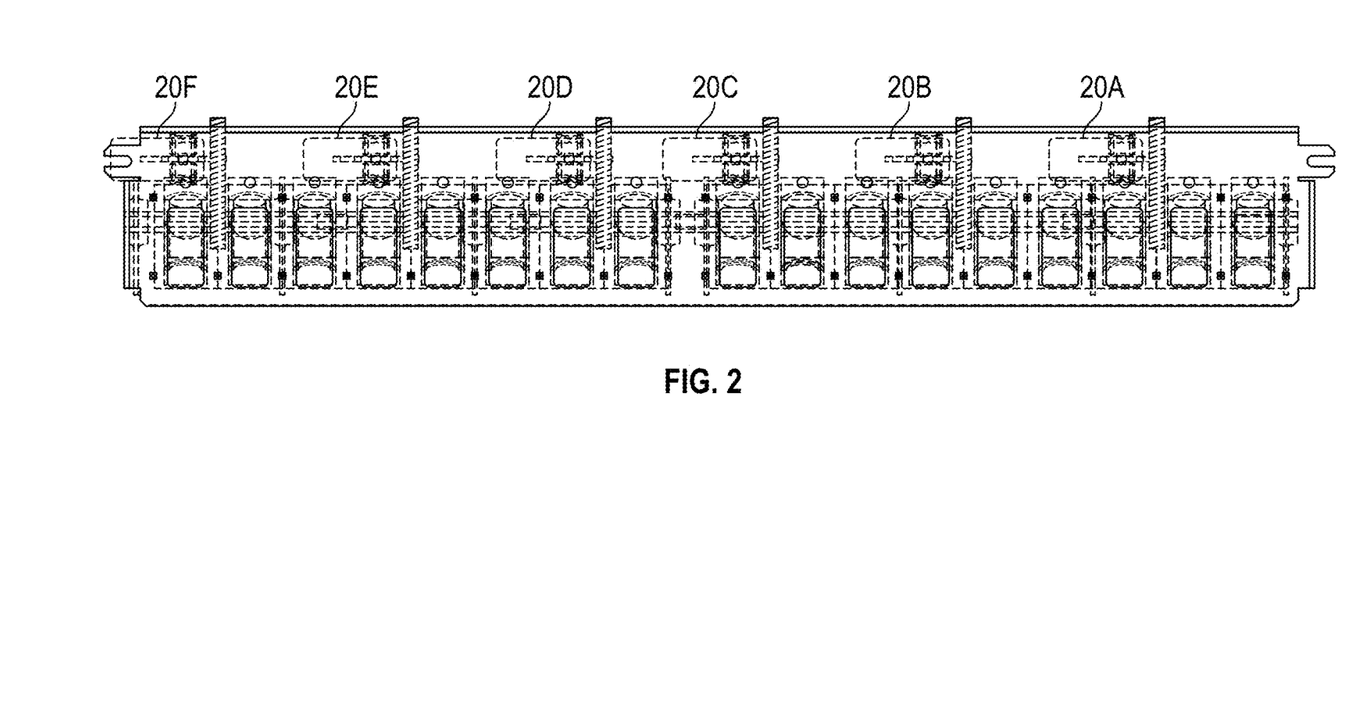
FIG. 2 is a top plan view of the manifold of FIGS. 1A-C.
Figure 3:
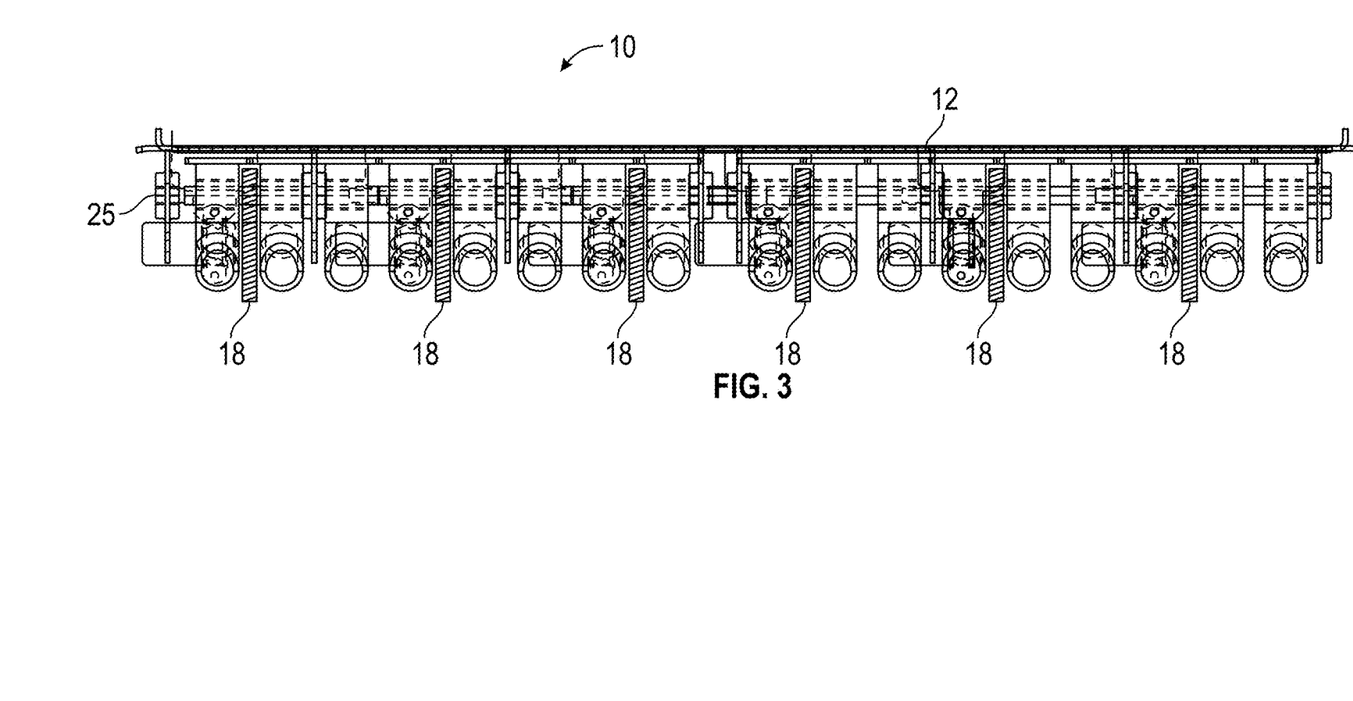
FIG. 3 is a front elevation view of the manifold of FIGS. 1A-C.
Figure 4:
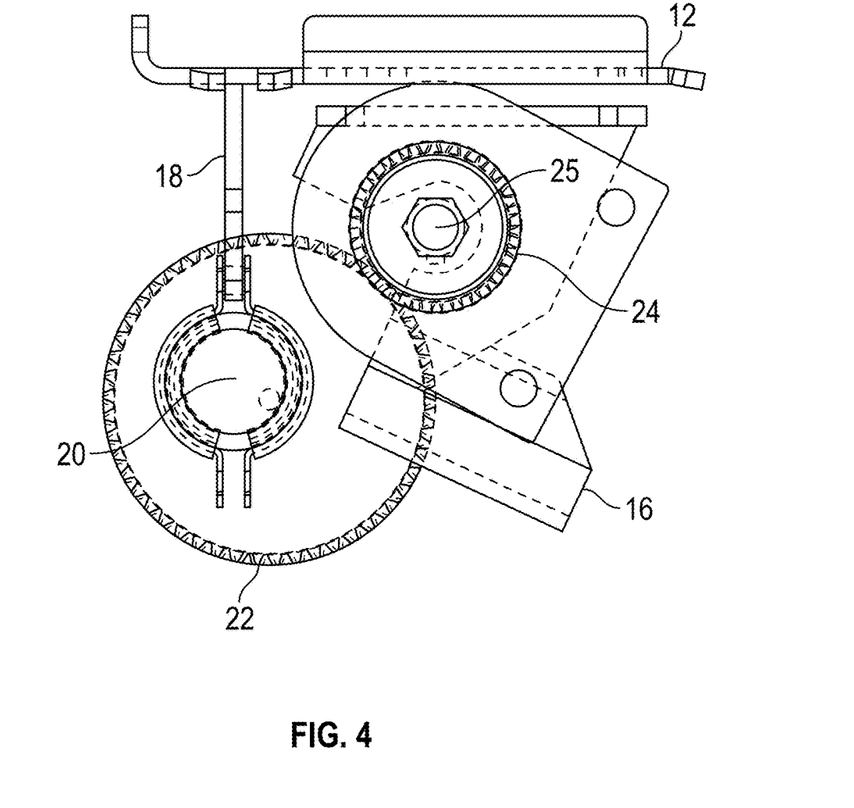
FIG. 4 is a front elevation view of the manifold of FIG. 1A showing in dashed lines the gear set for a single motor.
Figure 5:
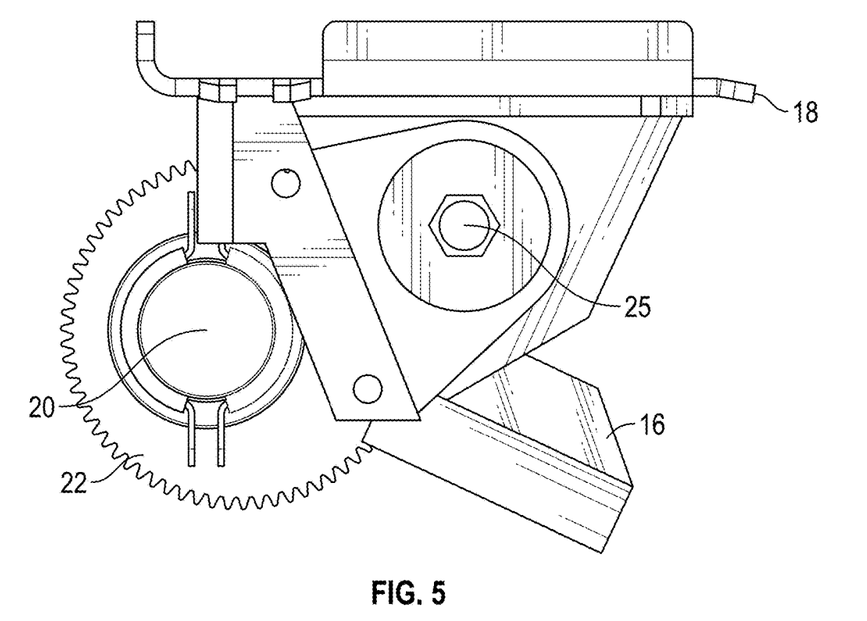
FIG. 5 is a side elevation view of the manifold of FIG. 1A.
Figure 6:
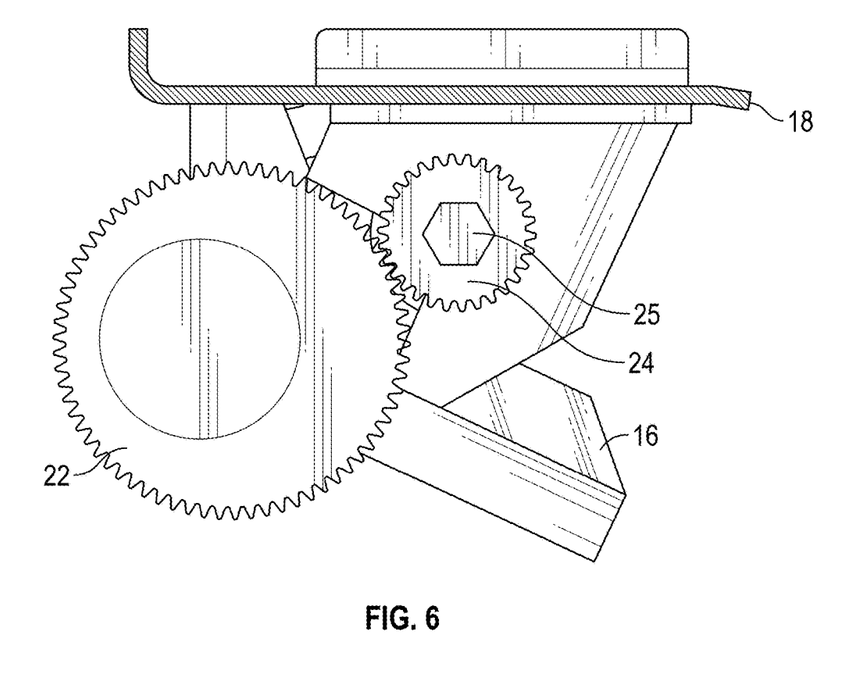
FIG. 6 is an elevation view from the opposite side of FIG. 5.

By reference to FIGS. 1A-1C, a generalized embodiment relative to a soybean air seeder implement is illustrated. The seeder can take the form of a conventional air seeder, such as the commercially available John Deere Model 1990 CCS.

This embodiment modifies seed distribution by utilizing a seed distribution manifold 10 and a controller 30. The manifold 10 and controller 30 include a plurality of seed metering rollers 40 mounted on hex axles 25. A plurality of variable speed electric motors 20 are connected by a gear train 22, 24 to rotate the axle 25, and thereby rotate the seed rollers 40, as will the further described below.

The controller has two-way communication with motors 20 to control both on/off states of roller rotation and adjust motor speed for variable roller rotation rate. The two-way communication can include feedback from, for example, a digital encoder or other motor speed sensor to inform the controller in real-time of motor speed.

The controller can be connected to a user interface that can allow manual adjustment of on/off states and/or motor speed to any of the motors. This could be by electromechanical switches. Alternatively, it could be icons on a touchscreen display such as are available in precision ag systems.

Other possible sources of information for the controller 100. GPS data, such as typically available through a precision ag system or automated navigation system (e.g. GNSS or inertial with GNSS compensation), that are frequently used with and on-board agricultural tractors. Additional input information or data for the controller is ground speed from a purely inertial navigation system. Parameters such as implement or vehicle ground speed can be obtained. The controller can utilize the data with appropriate programming for correlation calibration of the speed of the motors 20 relative to ground speed. In a similar fashion the controller can be programmed to utilize other information or data to control motor speed and/or motor on/off. One example can be reference to a field map through a precision ag system to turn a bank or section of the seed rollers on or off.

Control system 30 can be in digital communication with further intelligent devices. One example is a remote computer. Another example is a server through wireless communication over the Internet, to allow communication with devices remote from the field being planted. This could allow retrieval of data, programming, or other information while planting. The controller can also send data to the remote site for storage or further use.

This generalized embodiment in the context of an air seeder for soybeans is intended to illustrate how on/off and speed adjustment is available to sets of the rollers. A roller set can include one roller or several rollers. Thus, by utilizing relatively inexpensive and robust electrical motors and gear trains, this high flexibility of control and management of the distribution manifold operation is possible. A benefit is that either on/off states or rate control can be adjusted in real-time. Feedback from the motors can inform a controller of state of operation or rate at each set of rollers. This can be used for either control or analysis.

The present invention modifies and improves an air seeder, such as, for example, a John Deere model 1990, so as to have variable rate seeding with sectional shut off of the seed meters for use in planting seeds. With this new, improved seed planter, the farmer can reduce seed costs by 6-20%.

One modification to the air seeder is the elimination of the conventional ground-contacting drive wheel and mechanical linkage to the seed meters, and replacement with variable speed electric motors on each of the planter units.

The system includes one or more controllers to provide variable seed rate control, with sectional shut off capability, and also provide blockage monitor notifications, calculate GPS based field coverage, and read a speed sensor for measuring ground speed.

Specific Embodiments

FIGS. 1A and 1B show an air seeder manifold 10 in isolation (apart from the air seeder) according to one embodiment. Typically, there will be a left manifold and a right manifold for each half of the planter. It is understood that while the manifold of FIGS. 1A and 1B has 17 seed meters that could each service a planter unit, manifold 10 of the air seeder may have more or less meters for more or less rows, depending on the number of rows on the air seeder.

Each manifold 10 includes a base plate 12 with inlets 14 which are in communication with a bin or hopper 26, which can be a conventional seed hopper which feeds seed in bulk to manifold 10. A seed outlet chute or cup 16 is associated with each of the inlets 14. As will be discussed further below, a seed meter subassembly including a motor and gears controls the metering of seeds between each inlet 14 and its associated outlet 16.

The manifold 10 also includes a plurality of motor mount brackets or plates 18 welded or otherwise mounted to the manifold, which support a series of direct current (DC) electric motors 20. Each motor 20 is operatively connected to a seed meter via a set of meshing gears 22, 24. In this exemplary embodiment, each one of the motors 20 drives two to four seed meters. The motor 20 drives the gear 22, which in turn drives its associated gear 24, which is mounted on a hex shaft 25. For example, in FIG. 1A, the motor 20A drives the seed meter for the first three outer row units; the motor 20B drives the seed meter for the next three row units; motor 20C operates the seed meter for the next three units; motor 20D operates the seed meter for the next three row units; motor 20E operates the seed meter for the next three rows; and motor 20F operates the last two seed meters. As an alternative embodiment, a separate motor 20 can be provided for each seed meter or planter. Thus, for example, on the seventeen row planter shown in FIG. 1A and FIG. 1B, there would be seventeen electric motors instead of six.

As seen in FIGS. 8-12 in another alternative embodiment, separate and independent pods or modules 30 A-F are provided for each motor 20. More particularly, each pod includes the base 42 which can be removably bolted to the manifold 10 such that pods can be individually removed for maintenance and repair. A motor bracket 18 is welded or otherwise connected or formed with the base plate 12. The motor 20 is bolted or otherwise fastened to the motor bracket 18, with the motor shaft 21 extending through the bracket 18. The drive gear 22 is fixed on the shaft 21. The driven gear 24 is mounted on the hex shaft 25, which extends through bearings 28 extending from the base plate 12. The seed meter rollers or wheels 40 are mounted on the hex axle 25 for rotation with the axle. A cover plate 19 is removably secured to the bracket 18 so as to enclose the gears 22, 24.

Figure 8:
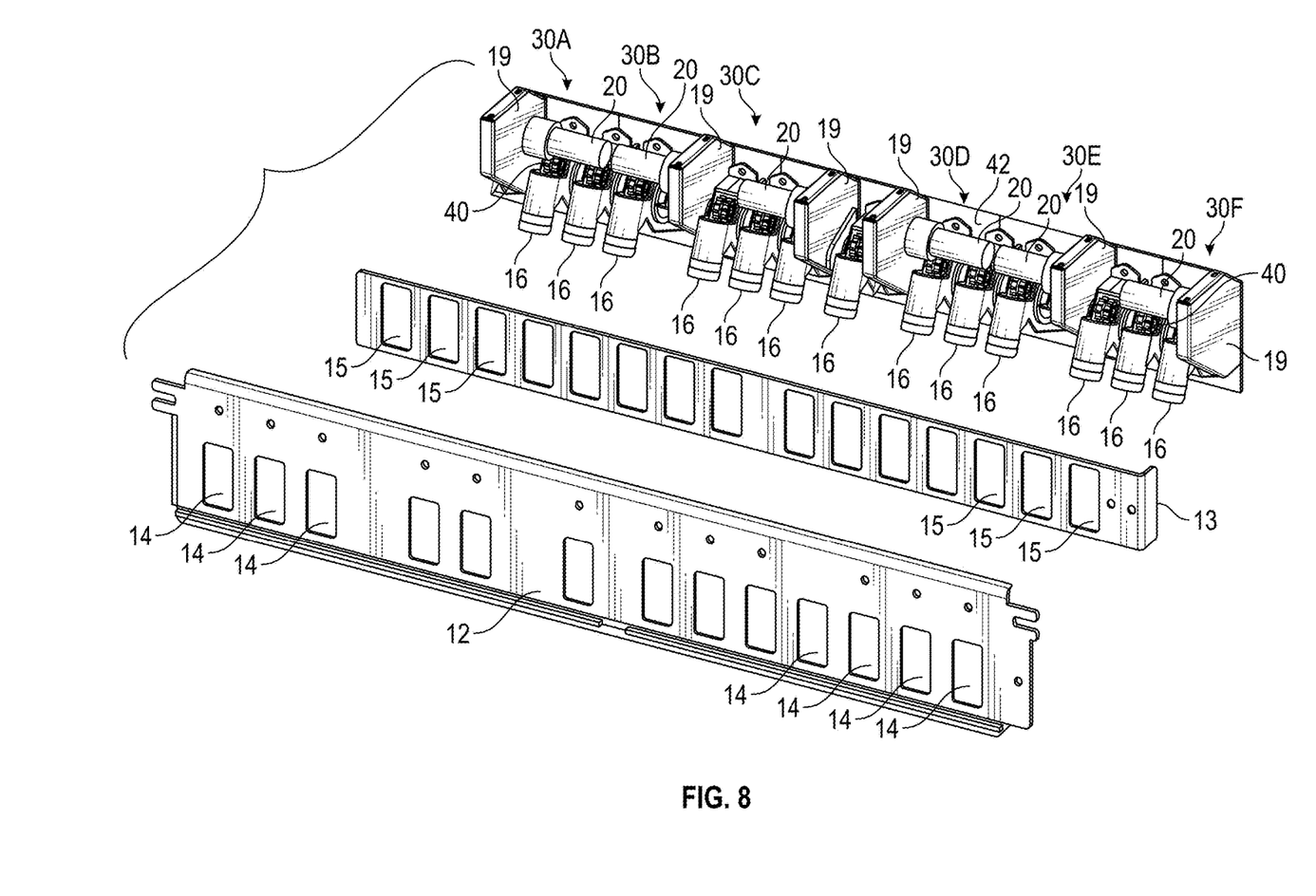
FIG. 8 is an exploded perspective view of the manifold assembly according to a second embodiment of the invention, wherein a plurality of removable modules or pods are provided on the manifold.
Figure 9:
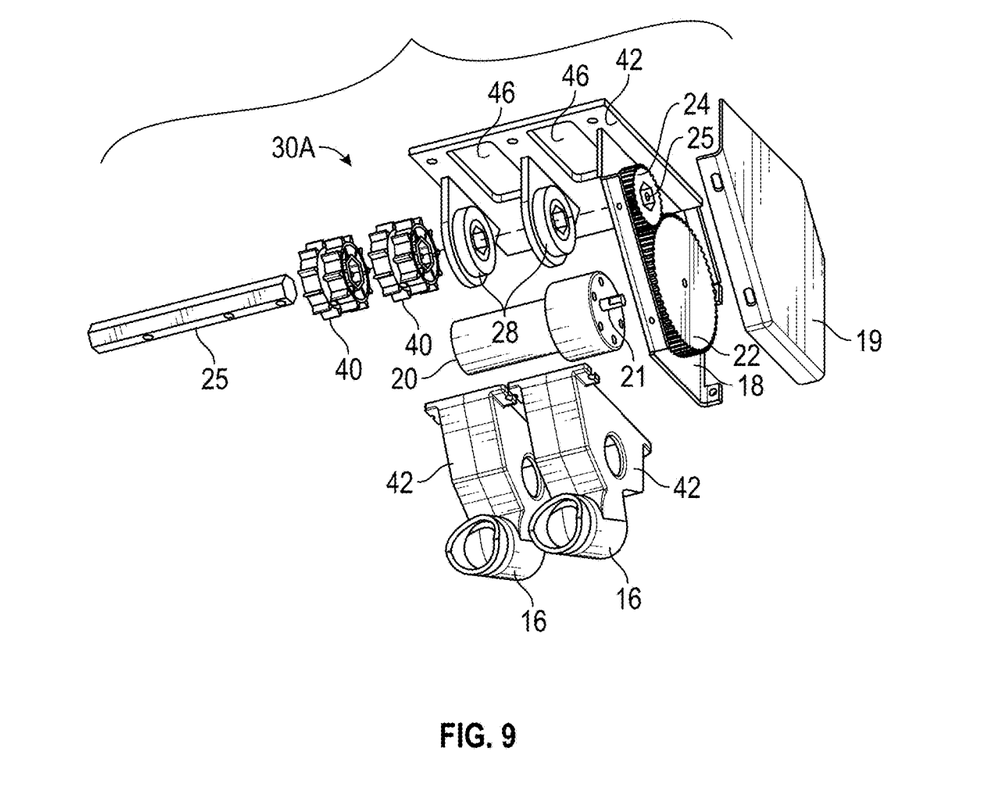
FIG. 9 is an exploded view of one of the modules of the embodiment shown in FIG. 8.
Figure 10:
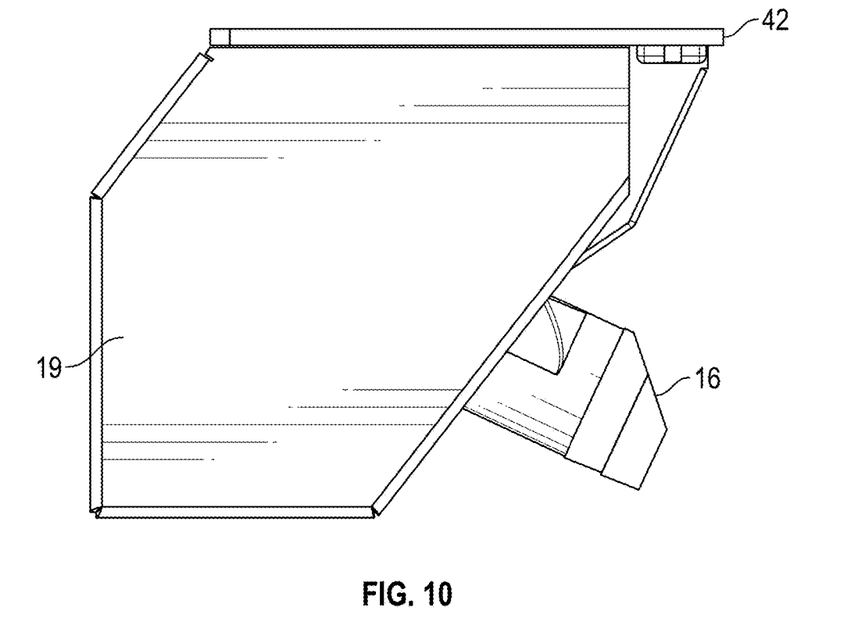
FIG. 10 is a side elevation view of the module for the embodiment shown in FIG. 8.
Figure 11:
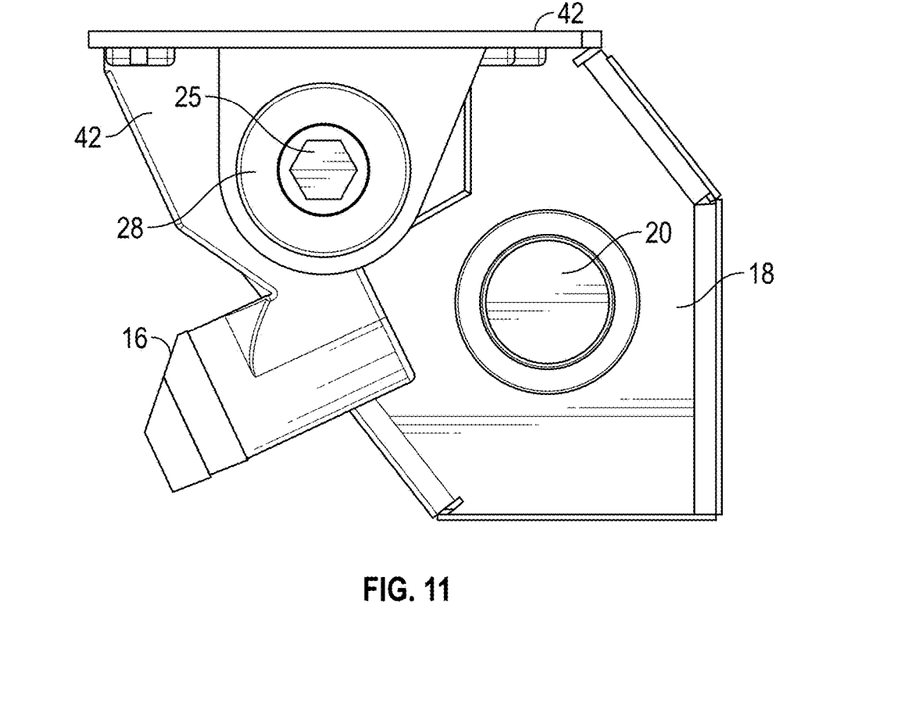
FIG. 11 is an opposite side elevation view of the module.
Figure 12:
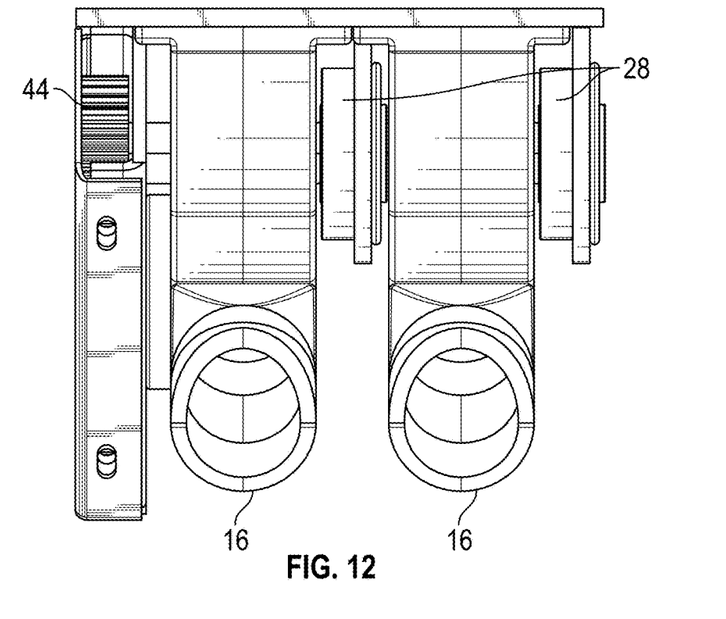
FIG. 12 is a front elevation view of the module.
Figure 13:
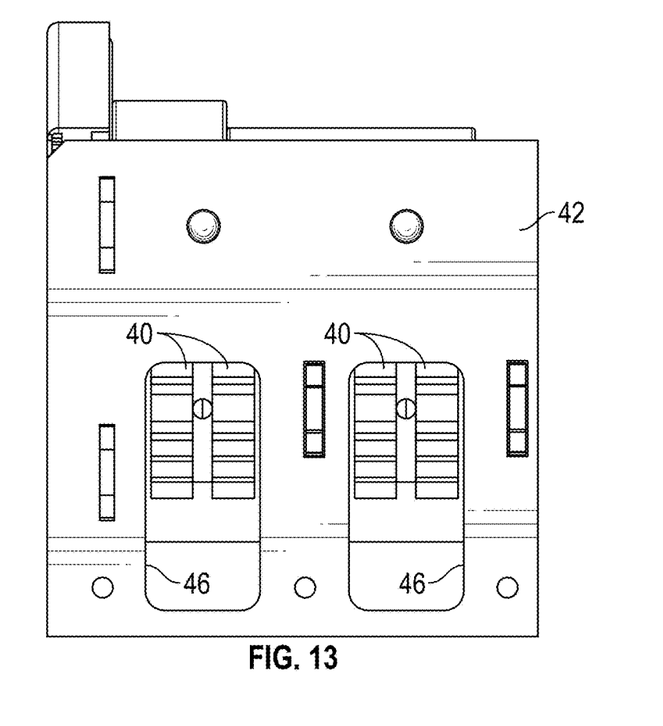
FIG. 13 is a top plan view of the module.

The seed meter housing 44 is detachable bolted or mounted to the base plate 42 so as to be aligned with one of the openings 46 in the plate 42. When the pods 30 are mounted to the manifold 12, the openings 14 and 46 are aligned. A slide gate 13 is provided between the manifold plate 10 and the pod base plate 42, and has a plurality of openings 15. The gate 13 is slidable between a first position wherein the gate openings 15 are aligned with the manifold inlets 14 and a second position wherein the gate openings 15 are misaligned from the inlets 14 such that the gate 13 closes the inlets 14. Thus, if one of the pods has to be removed for repair or maintenance, the gate 13 can be moved to the second or closed position to prevent seed from discharging through the exposed inlet 14.

It is understood that each pod or module 30 can take various configurations. For example, the pods can be formed as mirror images for the left and right halves of the planter. Also, the gears 22, 24 can be located at either end of the pod, or between inlet openings, depending upon the number of inlet openings and seed wheels 40 on the pod.

In one embodiment, all of the motors 20 are driven in unison, such that all of the seed wheels rotate at the same seed, though one or more of the motors 20 can be turned off, as desired or needed. Alternatively, the motors 20 can be driven at different speeds, for example if the planter is moving along an extended arc or curve when the outer end of the planter is moving over a greater distance at a faster speed than the inner end of the planter.

Thus, precise plant population can be achieved using the seed meters driven by the electric motors, according to the present invention.

Figure 7:
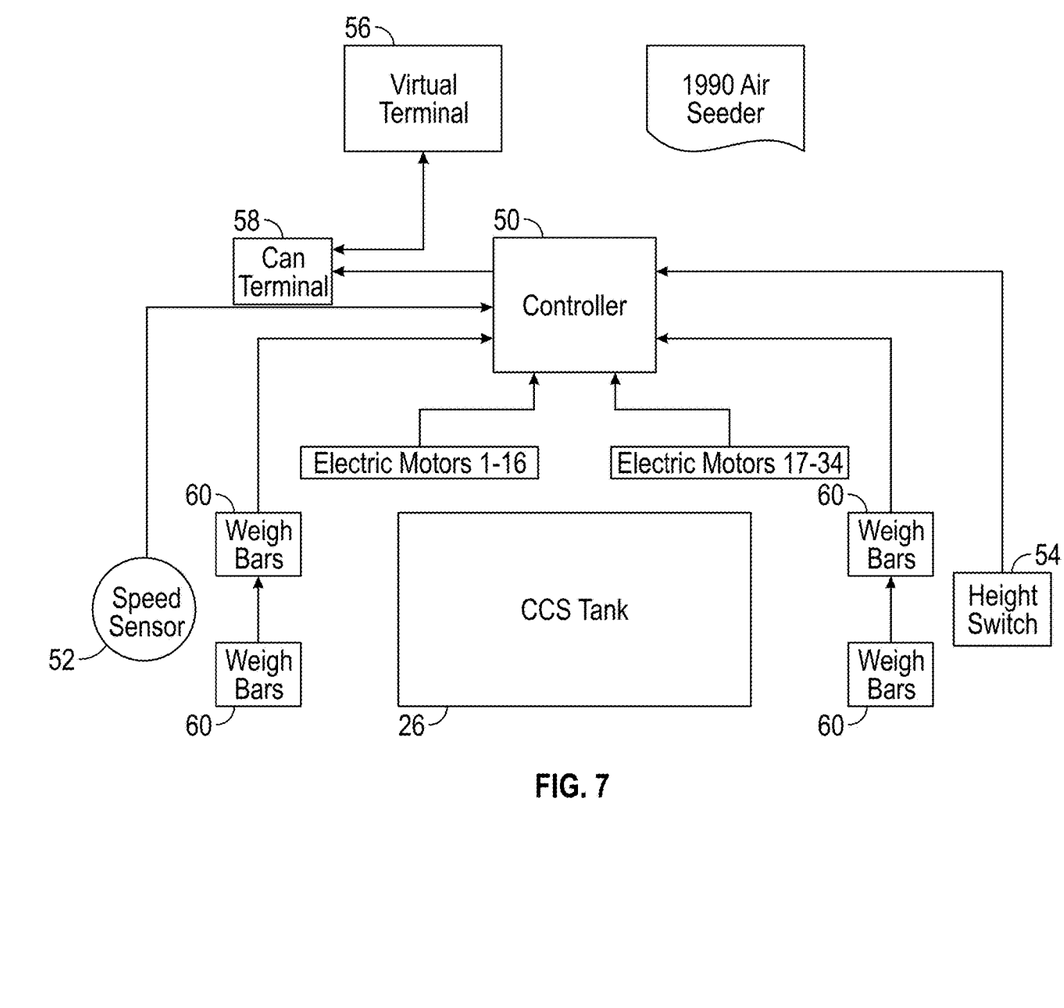
FIG. 7 is a schematic drawing of the seeder according to the present invention, with the controller, weigh bars, and sensors for the system.

The controller 50 may be a computer or microprocessor, which can also be set to receive signals from other components or devices, such weigh bars 60 on the bin 26, a speed sensor 52 for deriving in real-time over-the-ground velocity of the planter, a height switch 54 for deactivating the motors 20 when the planter is raised to a transport position, other GPS systems or precision ag, and the like (e.g. other known components used with planters). The controller 50 can communicate with a virtual terminal (e.g. tablet, laptop, smart phone, or other intelligent device) 36 in the tractor in any convenient manner, such as via a CAN bus (controller area network) terminal 58 through the IsoBus or through Wi-Fi using a tablet platform.

The air seeder allows the seed to fall by gravity, without the need for a vacuum. The controller utilizes an algorithm to determine seed population and adjust the motor speed, and thereby the seed dispensement by the seed meters to meet the desired population. The air seeder can be selectively shut off, including multiple rows shut off simultaneously, by the operator via the monitor 56 and controller 50, so as to eliminate or minimize over planting, such as at the end of rows.

The variable rate application is achieved by changing the motor speed via software which receives input, and the electric motors 20. The seed is from the bin or tank 26 before blow out, rather than at each row unit, as in the prior art.

This variable rate seeding system may be installed as original equipment, or may be an aftermarket installation on existing seeders that do not currently have variable rate control. The system includes one or more controllers that provide variable seed rate control with sectional shut off capability, provide blockage monitor notifications, calculate GPS based field coverage, and read a speed sensor for measuring ground speed. Examples of these controllers are commercially available from JCA Electronics, of Winnipeg, Manitoba, Canada, under the trademarks Falcon and Oriole. One example of the electric motor is part number 116-52612-1 sold by Hansen Corporation in Princeton, Ind.

There are at least two options for the display interface. The first is an ISOBUS interface and the second is an app interface running on a tablet.

In the exemplary embodiment, the variable rate control system uses two JCA Falcon controller customized with application specific software. The primary functions of the system are as follows:

Variable Rate Control: The user selects a target seeding rate though the display interface and communicates this to the Falcon controllers which control the variable speed motors to achieve this rate. There may be up to twelve motors connected to the Falcon controllers.

Section shut off: The Falcon controllers track seeding area (location of the planter in the field) using a GPS signal that is provided by the tractor or otherwise. The system shuts off overlapping sections to avoid reseeding.

Blockage Monitoring: Existing blockage sensors are connected to the Falcon controllers. If the sensors indicate a blocked row, a warning is provided to the operator. There may be up to 34 sensors connected to the system.

Ground Speed: A ground speed sensor is used to validate the GPS signal. Ground speed is used in the variable rate calculation.

Height Switch: A height switch is installed to indicate when the implement has been raised for transport. The row planter units are movable between a lowered position for planting a raised position for transport. In transport mode, the system will stop seeding and stop tracking field coverage.

The Falcon controller can act as an ISOBUS implement controller that shows up as an attached implement on the ISOBUS Universal Terminal (UT) screen. When the implement is selected from the UT screen, a customized screen provides monitoring and calibration options for the variable rate system. An alternative option is to utilize a tablet as the display interface. An app for the tablet shows the same control information that is shown on the ISOBUS display but also incorporate tablet features such as GPS, Maps, and Weather.

Falcon controller has 13 outputs that can be used to control actuators and 16 inputs that can be configured through software to interface with most sensor types. The Falcon controller has 2 CAN bus communication channels to communicate with other controllers and communicate on an ISOBUS network, and it has Wi-Fi communication for wireless communication with tablets and smartphones. The Falcon controller also has internal memory that can be used for storing application specific data logs and/or ISOBUS UT graphics/screens.

The electric motor can have a variable speed adjustment with a pulse-width modulated (PWM) signal. The Falcon controller has outputs rated for 3 Amps each. The motors have an operating current of 1 A and a stall current of 2 A, which fall within the capabilities of the Falcon controller.

The ISOBUS interface utilizes a Virtual Terminal (VT) installed in the tractor to display seeding information. The details of the VT display are stored within the implement controllers and uploaded to the VT upon connection to the tractor.

In the second option using a mobile device, the Falcon controller software may cover the control functions necessary for the seeding application. Unlike the IsoBus, it is not necessary to store the display screens within the implement controller. The Falcon controllers connect to a mobile device, such as a tablet or smartphone, using WiFi communication. Data necessary for display purposes can be transmitted wirelessly over the WiFi connection to the connected mobile device.

An app runs on the mobile device and provides the user interface to the operator. The display technology on mobile devices allow for a sophisticated user interface that is difficult to achieve on a VT. The app may be for the Android OS, but also allows for porting the app to Apple IOS and Microsoft. The app can be made available to customers though the corresponding app store where it can be downloaded directly to their device. The app can take advantage of the features that reside on the mobile device such as Google mapping. This allows the land coverage screens to be overlaid on the top of a Google map showing the actual land area being seeded. Mobile device features such as weather, GPS, and cloud connectivity could also be incorporated. The tablets and smartphones that run the app are commercially available.

As will be appreciated, the specific way in which individual motor control of individual sets of rollers can vary according to desire and need.

Additionally, other inputs could be utilized in a control algorithm for the motors. In one example, weight bars could send information as to how much seed is in hopper 26 to inform the controller when to turn the motors on or off. Such weight bar sensing is known in the art. The weigh bars can also generate a signal to inform the operator as to when to refill of the hopper.

Similarly, height switch 34 senses the raised transport position of the planter inform the controller to deactivate the motors.

The exemplary embodiments allow an agricultural producer to interchange and select seed roller style for a given crop and field. For example, the John Deere 1990 CSS air seeder has at least three different form factors of rollers for different types of seeds of different seeding situations. Such rollers are typically relatively inexpensive and made of moldable plastics. Therefore, having an inventory of different styles of rollers is relatively inexpensive and allows easy changeover. Details can be seen in the patents incorporated by reference patents herein.

Additionally, this allows practical and economical development of inventories of rollers and driven gear combinations. Simple molding techniques can be made to create such components. Unlike the built-in clutches of the multi-piece rollers of U.S. Pat. No. 8,196,534, single piece, molded rollers are possible.

With this invention, there is automatic motor speed control by the controller based on pre-programming or feedback from sensors including motor speed sensors, ground speed sensors or data, field maps, or the like. There is manual on/off control for specific situations. For example, there could be manual on/off control for a special field conditions such as needed for less than full planting width.

Options and Alternatives

It will be appreciated that the invention can take different forms of embodiments. Some examples of been indicated above.

It is to be understood that soybean seeds are typically planted in rows and can benefit from the invention. However, other seeds and even other bulk products such as fertilizers, insecticides, and the like might be beneficially metered and distributed according to the invention. Examples of other seeds include: wheat, milo, barley oats, sorghum and rice. Examples of other bulk products include: fertilizer, herbicide, and insecticide.

The number of rollers per independent motor control can be selected by the designer. One factor may be cost. Another factor may be room as far as fitting in motors in the manifold. It is to be understood, however, the invention allows individual and independent control of on/off states and speed of each set of rollers, where the set can be one or more rollers or wheels. Motors would be selected by the designer according to need or desire. Motors could be of a variety of form factors, operating characteristics, and sizes as appropriate.

The gear trains could be substituted according to design and need, as would the motors and their range of speeds and torques, etc.

The controller could be any of a variety of commercially available intelligent controllers. Examples are a chip, an expansion card, or a stand-alone device that interfaces with a peripheral device. There may be a link between the controller and the peripheral or the controller can be built into, in the same housing or otherwise at least partially integrated with the motors. The controller could be a master controller onboard the implement. It could be on the tractor and communicate with an interface on the implement connected to the motors. There could be a master and slave situation. Other configurations are possible. Still further, as indicated, the controller could communicate with and be informed by other devices for a variety of different functions and features.

Feedback of motor speed can be done in a variety of ways. One example is sensing or reading of motor shaft speed with a sensor at the motor axle. One example is a rotary encoder such as are known in the art.

Reasons for varying motor speed include not only intentionally increasing or decreasing population rate, but also to keep population rate at target rate. Such things as air temperature and altitude can affect air seeder operation, including manifold pressure. By monitoring population rate (e.g. by a seed counter which senses in real time the number of seeds per unit time or distance), to keep closer to population target (e.g. with reference to a field map of a precision ag system which gives the target population for that part of the field), motor speed can be adjusted to compensation for such deviating factors.

The invention has been shown and described above with the exemplary embodiments, and it is understood that many modifications, substitutions, and additions may be made which are within the intended spirit and scope of the invention. From the foregoing, it can be seen that the present invention accomplishes at least all of its stated objectives.

What is claimed is:

1. A variable rate central commodity system air seeder, comprising:
   a seed hopper;
   a manifold having a plurality of seed inlets to receive seed from the seed hopper;
   a plurality of seed meters mounted on the manifold beneath the seed inlets, and each seed meter having a seed outlet;
   a plurality of variable speed electric motors connected to the seed meters to control dispensement of seeds from the seed meters; and
   a control system to adjust speed of the motors on the fly and to allow selective shut off of one or more of the motors as the system moves through a field during planting.

2. The air seeder of claim 1 wherein the seed meters and motors are mounted on a series of independent modules.

3. The air seeder of claim 2 wherein the modules are removably secured to the manifold.

4. The air seeder of claim 1 further comprising a display connected to the control system.

5. The air seeder of claim 1 further comprising a gate slidably mounted to the manifold to open and close the inlets.

6. The air seeder of claim 1 further comprising a gear train between each motor of the seed meters.

7. The air seeder of claim 1 wherein the air seeder is free from a ground drive wheel.

8. A method of planting seeds, comprising:
   dispensing seeds from a plurality of planters on a central commodity air seeder system;
   controlling dispensement of the seeds using variable speed electric motors;
   providing data to a controller operatively connected to the motors; and
   adjusting speed of the motors in the field without stopping the movement of the planters through the field in response to the data so as to dispense the seeds at variable rates;
   selectively shutting of one or more of the motors in response to the data as the planters move through the field.

9. The method of claim 8 further comprising sensing the speed of the planters and providing speed data to the controller.

10. The method of claim 8 further comprising monitoring blockage of the planters and sending a signal to the controller if a blockage condition exists.

11. The method of claim 8 further comprising sensing ground speed to validate a GPS signal.

12. The method of claim 8 further comprising sending a signal to the controller when the planters are raised for transport and turning off the motors in response to the signal.

13. The method of claim 8 wherein the data includes field locations, ground speed, planter blockage, and planter position.

14. A method for controlling seed distribution from a central commodity air seeder system having a distribution manifold having a plurality of metering rollers on a shaft for distributing agricultural bulk product to a field, the method comprising:
   a. Supplying the bulk product to the metering rollers;
   b. individually controlling sets of the metering rollers by:
      i. linking each set of rollers to a variable speed electrical motor and gear train; and controlling motor speed of the electrical motor to drive the gear train which imparts rotation to the set of rollers;
      ii. to either start or stop the set of rollers and vary rotational speed of the rollers by controlling motor speed in the field while the central commodity air seeder system is moving through the field.

15. The method of claim 14 further comprising a programmable controller to control motor speed according to data or sensor input.

* * * * *